(12) United States Patent
Overes

(10) Patent No.: US 8,167,434 B2
(45) Date of Patent: May 1, 2012

(54) LIGHT PROJECTION SYSTEM AND DISPLAY DEVICE

(75) Inventor: Theodorus Franciscus Emilius Maria Overes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 302 days.

(21) Appl. No.: 12/519,532

(22) PCT Filed: Dec. 13, 2007

(86) PCT No.: PCT/IB2007/055077
§ 371 (c)(1),
(2), (4) Date: Jun. 17, 2009

(87) PCT Pub. No.: WO2008/078226
PCT Pub. Date: Jul. 3, 2008

(65) Prior Publication Data
US 2010/0014055 A1 Jan. 21, 2010

(30) Foreign Application Priority Data
Dec. 21, 2006 (EP) .................................. 06126814

(51) Int. Cl.
*G03B 21/14* (2006.01)
*G02B 6/00* (2006.01)
(52) U.S. Cl. ........................... 353/34; 353/122; 362/551
(58) Field of Classification Search .................... 353/31, 353/34, 122; 362/551, 559, 257; 385/131, 385/146
See application file for complete search history.

(56) References Cited

U.S. PATENT DOCUMENTS

| 5,339,382 | A | 8/1994 | Whitehead |
| 5,661,839 | A | 8/1997 | Whitehead |
| 6,915,062 | B2 | 7/2005 | Hulse et al. |
| 2003/0063361 | A1* | 4/2003 | Ohnishi et al. ................ 359/237 |
| 2007/0211488 | A1 | 9/2007 | Cassarly et al. |

FOREIGN PATENT DOCUMENTS

| GB | 2153515 A | 8/1985 |
| WO | 9833008 A1 | 7/1998 |
| WO | 0171247 A1 | 9/2001 |
| WO | 2005076602 A1 | 8/2005 |

* cited by examiner

*Primary Examiner* — Kevin Pyo

(57) ABSTRACT

The invention relates to a light projection system (10) for use in conjunction with a display device (40). The light projection system comprises a light source for emitting light being modulated by video and/or audio content of the display device (40), and a light guide (20). The longitudinal light guide guides light emitted by the light source substantially along a longitudinal axis (26) and projects the light propagating through the longitudinal light guide on a projection surface (50). The longitudinal light guide comprises: a light input window, and a plurality of light out-coupling elements. The plurality of light out-coupling elements project the light on the projection surface via light out-coupling elements comprising sub-sets (70a, 70d) of light out-coupling elements. A particular sub-set (70a, 70d) is arranged for substantially illuminating a particular area (50a, 50d) of the projection surface (50). A luminous intensity emitted by the particular sub-set is dependent on a distance ($d_a$, $d_d$) along a straight line between the particular sub-set and the particular area, and/or on an angle between the straight line and normal of the projection surface. The effect of the measures according to the invention is that the variation of the luminous intensity over the particular area is reduced.

16 Claims, 5 Drawing Sheets

LIGHT PROJECTION SYSTEM AND DISPLAY DEVICE

FIELD OF THE INVENTION

The invention relates to a light projection system for use in conjunction with a display device.

The invention also relates to a display device.

BACKGROUND OF THE INVENTION

A recent development in display technology is the adding of ambient light effects using an ambient light illumination system to enhance the visual experience when watching content displayed on the display device. This ambient light effect illuminates the surroundings of the display device, such as a television, with light associated with the content of the image currently displayed on the display device. For example, the ambient light effect is generated using an ambient light system which is part of the display device. The illumination system may illuminate a wall behind the display device with light associated with the content of the image. Alternatively, the display device may be connected to a remotely located illumination system for remotely generating the light associated with the content of the image. When the display device displays a sequence of images, for example, a sequence of video frames being part of video content, the content of the images shown in the sequence generally change over time which results in the light associated with the sequence of images to also change over time.

Such a light projection system is disclosed in WO 2005/076602, which discloses means for background lighting at the back of a display apparatus. The means for background lighting comprise two illumination units being provided at the right-hand and left-hand of the display apparatus. The illumination units are formed as substantially vertically positioned longitudinal light guides comprising means for coupling out light. The light guides are provided on at least one of its ends with a light source. The light source preferably comprises colored LEDs.

A drawback of the known ambient light system is that the illumination of the surface is not homogeneous.

SUMMARY OF THE INVENTION

It is an object of the invention to provide a light projection system which improves the homogeneity of the projection surface.

According to a first aspect of the invention the object is achieved with a light projection system for use in conjunction with a display device, the light projection system comprising:
  a light source for emitting light being modulated by video and/or audio content of the display device, and
  a longitudinal light guide for guiding light emitted by the light source substantially along a longitudinal axis and for projecting the light propagating through the light guide on a projection surface, the longitudinal light guide comprising
a light input window arranged at an end-portion of the longitudinal light guide, the light input window being arranged for coupling in light from the light source into the longitudinal light guide substantially along the longitudinal axis, and
  a plurality of light out-coupling elements for projecting the light on the projection surface, the plurality of light out-coupling elements comprising sub-sets of light out-coupling elements, a particular sub-set being arranged for substantially illuminating a particular area of the projection surface, a luminous intensity emitted by the particular sub-set being dependent on a distance along a straight line between the particular sub-set and the particular area, and/or on an angle between the straight line and a normal of the projection surface.

The effect of the measures according to the invention is that by making the luminous intensity dependent on the distance between the particular sub-set and the particular area and/or on an angle between the straight line and the normal of the projection surface, the light distribution over the particular area can be influenced, which enables the variation of the luminous intensity over the particular area to be homogenized. If the distance between the particular sub-set of light out-coupling elements and the particular area changes and/or of the angle between the straight line and the normal of the projection surface changes, the luminous intensity per area changes and thus the illumination of the projection surface is not homogeneous. In the light projection system according to the invention, the luminous intensity of the light emitted from a particular sub-set is dependent on the distance between the particular sub-set and the particular area and/or on the angle between the straight line and the normal of the projection surface, which enables a homogenization of the illumination of the projection surface.

In the known system, the illumination units comprise of a longitudinal light guide having a cylindrical form in which the width of the coupling out area increases as the distance from the light source to the coupling out area increases. The effect of this arrangement of the out-coupling elements is that the amount of light coupled out remains substantially constant over the length of the light guide. Due to this constant emission of light over the length of the longitudinal light guide, the illumination of the projection surface in a direction substantially parallel to the longitudinal axis by the known longitudinal light guide will be relatively homogeneous, while the illumination of the projection surface in a direction substantially perpendicular to the longitudinal axis of the known longitudinal light guide is clearly not homogeneous, resulting in an overall non-homogeneous illumination of the projection surface. In the light projection system according to the invention, the luminous intensity which is emitted from the out-coupling elements toward the projection surface is dependent on the distance between the particular sub-set and the particular area illuminated by the particular sub-set and/or on the angle between the straight line and the normal of the projection surface, rather than dependent on the distance between the particular sub-set and the light source. The effect obtained by the projection system according to the invention is therefore clearly different in that it enables a more homogeneous illumination of the projection surface, also in a direction substantially perpendicular to the longitudinal axis.

In an embodiment of the light projection system, the luminous intensity emitted by the particular sub-set increases when the distance along the straight line between the particular sub-set and the particular area increases and/or when the angle between the straight line and the normal of the projection surface increases. Typically the size of the area illuminated by the particular sub-set is dependent on the distance between the particular sub-set and the particular area and/or is dependent on the angle between the straight line and the normal of the projection surface. When the distance increases the particular area illuminated increases. When the angle increases the particular area illuminated increases. When the luminous intensity is constant, the emitted light must be spread out over a larger particular area, resulting in a reduce intensity on the particular area. In the light projection system according to the invention, the luminous intensity emitted by the particular sub-set increases when the distance between the particular sub-set and the particular area increases and/or when the angle increases, thus leveraging the increase in particular area due to the increase of the distance which result in an increase in the homogeneous illumination of the projection surface.

In an embodiment of the light projection system, the luminous intensity emitted by the particular sub-set is dependent on a density of light out-coupling elements in the particular sub-set, or is dependent on a dimension of the light out-coupling elements in the particular sub-set. The luminous intensity of a particular sub-set of light out-coupling elements may be influenced by changing the density of the light out-coupling elements within the particular sub-set of light out-coupling elements. For example, increasing the density of the light out-coupling elements results in more light per unit area or volume to be emitted from the particular sub-set, and vice versa. Alternatively, the luminous intensity of a particular sub-set of light out-coupling elements may be influenced by the dimension of the light out-coupling elements in the particular sub-set. For example, increasing the dimensions of the light out-coupling elements again results in more light per unit area or volume to be emitted from the particular sub-set, and vice versa.

In an embodiment of the light projection system, the luminous intensity emitted by the sub-sets changes in a tangential direction around the longitudinal axis. When, for example, the projection surface is arranged substantially parallel to the longitudinal axis of the longitudinal light guide in the known light projection system, the illumination of the projection surface in a direction substantially parallel to the longitudinal axis typically is non-homogeneous. A particular sub-set illuminating a particular area typically is arranged adjacent in tangential direction to a further particular sub-set illuminating a further particular area. The distance between the particular sub-set and particular area is different compared to the distance between the further particular sub-set and the further particular area. By altering the luminous intensity emitted by the sub-sets in a tangential direction a variation in the illumination of the particular area and the further particular area of the projection surface due to the differences in distance can be reduced, improving the uniformity of the illumination of the projection surface.

In an embodiment of the light projection system, the plurality of light out-coupling elements is arranged at a wall of the longitudinal light guide, the wall being arranged substantially parallel to the longitudinal axis. A benefit of this embodiment is that the light out-coupling elements can be applied to the longitudinal light guide relatively easily. Furthermore, a change of the distribution and/or dimension of the plurality of light out-coupling elements can be done relatively easily by altering the distribution and/or dimension of the light out-coupling elements applied to the wall of the longitudinal light guide.

In an embodiment of the light projection system, the plurality of light out-coupling elements arranged at the wall of the longitudinal light guide are arranged at a side of the longitudinal axis facing away from the projection surface. A benefit of this embodiment is that the light out-coupling elements need not to be transparent, which increases the choice of light out-coupling elements which may be chosen in the light projection system according to the invention. Even lacquer and/or paint may be applied to the wall of the longitudinal light guide for coupling out light.

In an embodiment of the light projection system, the longitudinal light guide is constituted of a solid material being substantially transparent to the light emitted by the light source. A benefit of this embodiment is that the solid material of the longitudinal light guide operates as a lens. The lens constituted by the longitudinal light guide typically behaves as a cylindrical lens, spreading and homogenizing the light emitted by the light out-coupling elements in a direction substantially parallel to the longitudinal axis, while collimating the light emitted by the light out-coupling elements in a direction perpendicular to the longitudinal axis. A shape of the cross-section of the longitudinal light guide determines the exact lens characteristics of the longitudinal light guide in a direction perpendicular to the longitudinal axis. The cross-section of the longitudinal light guide may be circular, ellipsoid, polygonal, or any other shape.

In an embodiment of the light projection system, a further sub-set of further light out-coupling elements are arranged for emitting light away from the projection surface. A benefit of this embodiment is that it enables a combination of both a projection of the light modulated by the video and/or audio content of the display device on the projection surface together with a diffuse emission of the modulated light, for example, in a direction towards the viewer.

In an embodiment of the light projection system, the out-coupling elements are chosen from the group comprising scratches, sandblasted structures, printed structures, indents, slits, lacquer and stickers.

In an embodiment of the light projection system, the light source comprises plurality of light emitting elements, each light emitting element emitting light of a primary color. A benefit of this embodiment is that the light coupled into the longitudinal light guide via the light input window may comprise different colors. Furthermore, by altering the contribution of the light emitting elements to the light coupled into the light guide, different mixtures of the different colors emitted by the plurality of light emitting elements can be generated by the light source and can be coupled into the longitudinal light guide.

Light of a primary color comprises light of a predefined spectral bandwidth around a specific wavelength. Typically three primary colors are used, for example, Red, Green and Blue. By choosing a specific combination of the Red, Green and Blue light substantially every color can be generated by the light emitting element, including white. Also other combinations of primary colors may be used in the light projection system which enables the generation of substantially every color, for example, Red, Green, Blue, Cyan and Yellow. The number of primary colors used in the light projection system may vary.

In an embodiment of the ambient light projection system, the longitudinal light guide comprises a further end-portion comprising a further light source. A benefit of this embodiment is that the intensity of the light coupled into the longitudinal light guide to be projected on to the projection surface can be increased. Furthermore, the further light source may couple light of a different color and/or intensity into the light guide. As a result, the light emitted by the light out-coupling elements arranged near the end-portion may be different compared to the light emitted by the light out-coupling elements arranged near the further end-portion. When the light projection system, for example, is arranged next to an image display area of the display device, an area of the image displayed on the image display area near to the end-portion may display a different color and/or intensity compared to a further area of the image displayed on the image display area near the further end-portion. By using a further light source, the light projection system according to the invention can adapt to the difference in color and/or intensity at the different areas of the image displayed on the image display area via a single longitudinal light guide. This further enhances the visual experience of the viewer when watching the image displayed on the image display area of the display device.

The invention also relates to a display device comprising an image display area and comprising the light projection system according to the invention.

In an embodiment of the display device, the display device further comprises a control unit for extracting color and/or intensity information from video and/or audio content, and for modulating the light emitted by the light source according to the extracted color and/or intensity information. A benefit of this embodiment is that the light projection system may directly extract the color information from the video and/or audio image or from the video and/or audio signal. This enables a continuous adaptation of the projected light even when, for example, the user switches channels. This embodiment also enables the modulation of the projected light according to the video and/or audio content when no specific ambient light signal is provided separately. The specific ambient light signal may, for example, indicate a corresponding color and/or intensity related to the video and/or audio content.

In an embodiment of the display device, the light projection system and the image display area are arranged in separate physical objects arranged at different locations. Typically, the ambient light systems are integrated in the display devices. The light projection system according to the invention is arranged in a separate physical object compared to the image display area displaying the image. The light projection system, for example, may be a lighting unit used for general illumination of a room, for example, arranged at a wall of the room or at a ceiling of the room. The lighting unit may have a specially designed appearance or may be an interior decoration light emitting element. The light projection system, for example, receives a control signal from the control unit of the display device to produce light being modulated in color and/or intensity by the video and/or audio content of the display device. This may be done, for example, via a home network or via a wireless connection between the light projection system and the control unit arranged, for example, near the image display area of the display device.

In an embodiment of the display device, the light projection system is rotatable around the longitudinal axis. A benefit of this embodiment is that a general direction of the projection of the emitted light from the longitudinal light guide can be adapted, for example, when the display device is not arranged substantially parallel to the projection surface. The light projection system may be rotated in order to illuminate the projection surface at a required location.

In an embodiment of the display device, the display device comprises a plurality of light projection systems arranged around the periphery of the image display area.

BRIEF DESCRIPTION OF THE DRAWINGS

These and other aspects of the invention are apparent from and will be elucidated with reference to the embodiments described hereinafter.

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1:
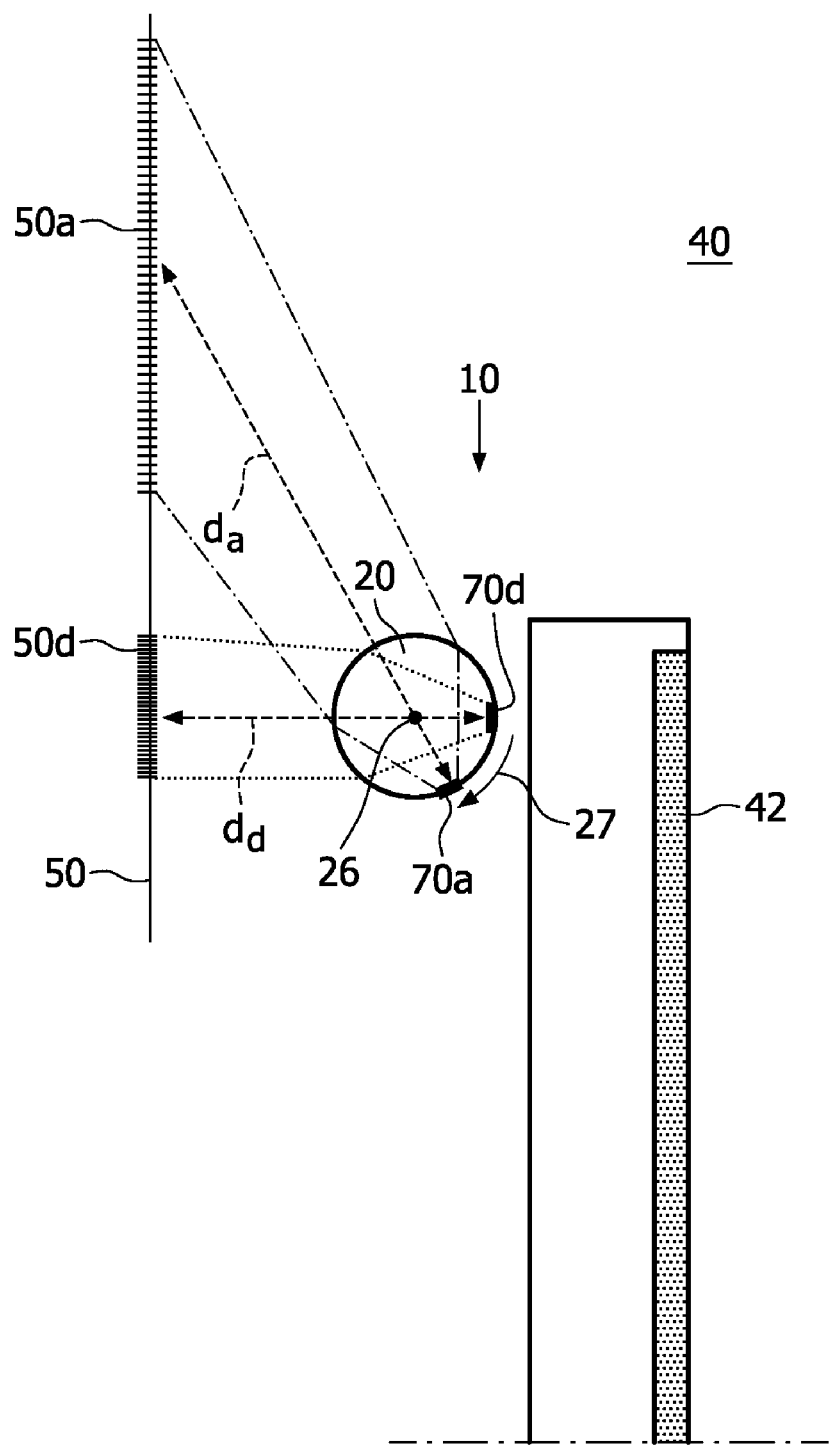
FIG. 1 shows a cross-sectional view of a display device comprising the light projection system according to the invention.

FIG. 1 shows a cross-sectional view of a display device 40 comprising the light projection system 10 according to the invention. The light projection system 10 shown in FIG. 1 comprises a cylindrical light guide 20 constituted of a solid material, for example, of Poly-Methyl-Meta-Acrylate (also known as PMMA), or of glass. The cylindrical light guide 20 is arranged at a side of the display device 40 facing away from an image display area 42 and is arranged for projecting light on a projection surface 50. The color and/or intensity of the projected light are modulated by video and/or audio content of the display device 40. The light guide 20 comprises a plurality of light out-coupling elements 60, 62, 64 (see FIG. 2) for projecting the light on the projection surface 50. The plurality of light out-coupling elements 60, 62, 64 comprise sub-sets 70a, 70d of light out-coupling elements 60, 62, 64. A first sub-set 70a is arranged for illuminating a first area 50a, and a second sub-set 70d is arranged for illuminating a second area 50d of the projection surface 50. The sub-sets 70a, 70d are arranged to emit a luminous intensity of the light guided through the light guide 20. The luminous intensity emitted by the particular sub-set 70a, 70d is dependent on a distance $d_a$, $d_d$ along a straight line between the particular sub-set 70a, 70d and the respective area 50a, 50d illuminated by the sub-set 70a, 70d. To obtain a substantially even illumination of the projection surface 50 by the light projected from the light guide 20, the luminous intensity emitted by the particular sub-set 70a, 70d increases when the distance $d_a$, $d_d$ along the straight line between the sub-set 70a, 70d and the corresponding illuminated area 50a, 50d increases. Because the first distance $d_a$, being the distance between the first sub-set 70a and the first area 50a, is larger than the second distance $d_d$, being the distance between the second sub-set 70d and the second area 50d, the luminous intensity emitted by the first sub-set 70a is larger than the luminous intensity emitted by the second sub-set 70d. This difference in luminous intensity emitted by the sub-sets 70a, 70d, which changes along a tangential direction 27 around a longitudinal axis 26 of the light guide 20, reduces the illumination variation over the projection surface 50 and enables a more even illumination of the projection surface 50.

The light guide 20 shown in FIG. 1 has a cylindrical shape having a substantially circular cross-section. Also other shapes of the light guide 20 are possible and different cross-sections are possible, such as ellipsoid (not shown) or polygonal shape (not shown). The shape of the cross-section together with the distribution of the light out-coupling elements 60, 62, 64 (see FIG. 2) can be chosen by the skilled person to obtain a specific required pattern of the projected light on to the projection surface 50.

The light projection system 10 according to the invention further comprises a light source 30 (see FIG. 2). The light source 30 is arranged at a light input window 28 (see FIG. 2) which is arranged at an end of the light guide 20. The light source 30 may comprise any light emitting elements 34, 36, 38 (see FIG. 2), such as an incandescent lamp (not shown), a luminescent lamp (not shown), a light emitting diode (see FIG. 2) and/or a light emitting laser (not shown). Preferably the light source 30 is able to emit light of different colors so that the color of the light emitted by the light source 30 can be modulated by the video and/or audio content of the content of the display device 40. This may be achieved by a color tunable light emitting element (not shown), or, preferably, this may be achieved using at least three light emitting elements 34, 36, 38, each emitting light of a different primary color R, G, B. The light source 30 may alter the contribution of each of the light emitting elements 34, 36, 38 and as such alter the contribution of the primary color R, G, B contributed to the light and as such determine a color of the light emitted by the light source 30 via the light input window 28 into the light guide 20 and projected towards the projection surface 50.

Light of a primary color R, G, B comprises light of a predefined spectral bandwidth around a specific wavelength. Typically three primary colors are used, for example, Red R, Green G and Blue B. By choosing a specific combination of the Red R, Green G and Blue B light substantially every color can be generated by the light source 30, including white. Also other combinations of primary colors R, G, B, C, Y may be used in the light projection system 10 which enables the generation of substantially every color, for example, Red R, Green G, Blue B, Cyan C and Yellow Y. The number of primary colors R, G, B, C, Y used in the light projection system 10 may vary. The adding of Cyan C and Yellow Y typically increase the color space defining the different colors which can be generated by the light projection system and enables an increase of the color saturation of the light projected by the light projection system.

The light emitted by the light source 30 via the light input window 28 into the light guide 20 preferably propagates through the light guide 20 via total internal reflection (also known as TIR). A benefit when using TIR is that the propagation of the light through the light guide is substantially loss-less which results in a relatively high efficiency of the light projection system 10 according to the invention.

The light projection system 10 shown in FIG. 1 is arranged at the side of the display device 40 facing away from the image display area 42. The light projection system 10 may form an integral part of the display device 40. Alternatively, the light projection system 10 may also be arranged separate from the display device 40, for example, arranged as a separate physical object at the projection surface 50, or even located elsewhere in the room as a lamp (see FIG. 4) or interior decoration element. This lamp or interior decoration element which comprises the light projection system 10 according to the invention may function in a first mode of operation as a general illumination device illuminating a room according to the requirements of a user, and in a second mode of operation the color and/or intensity of the light projected by the lamp or interior decoration element is modulated by the video and/or audio content of the display device 40. The light projection system 10 which is located remote from the display device 40 may receive color information from a control unit 44 (see FIG. 4) either via a wire or via a wireless connection, such as an in-home network (not shown). Alternatively, the light projection system 10 may, for example, mimic the color and/or intensity of the light which is projected by a light projection system 10 attached to the display device 40, or may determine the color and/or intensity via a sensor which, for example, senses a specific color and/or intensity from the image display area 42 or from a part of the image display area 42.

Figure 2A:
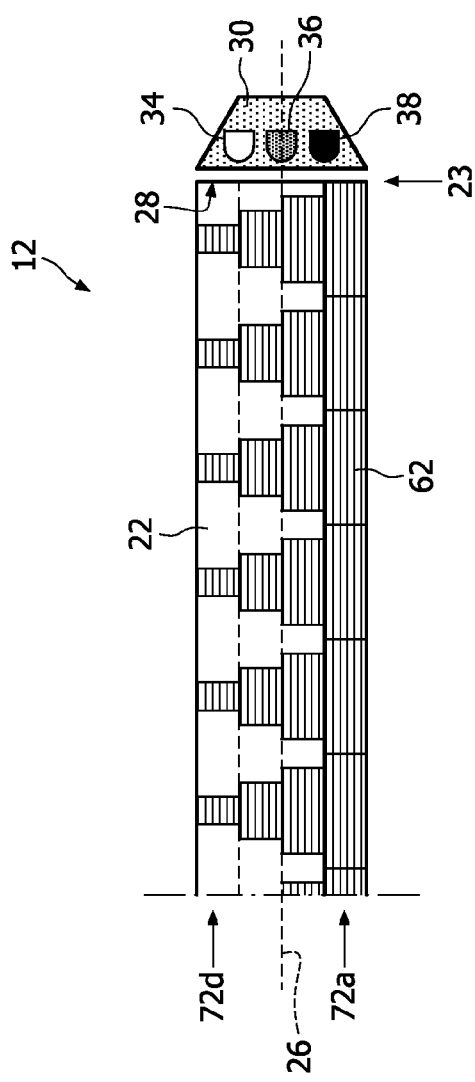
FIGS. 2A, 2B and 2C show several embodiments of the light projection system according to the invention seen from the projection surface.
Figure 2B:
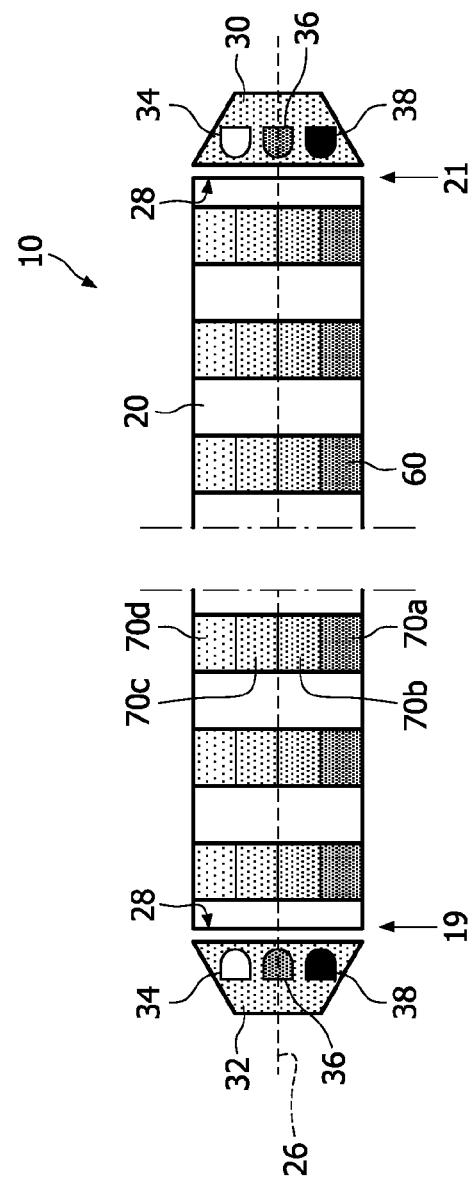
Figure 2C:
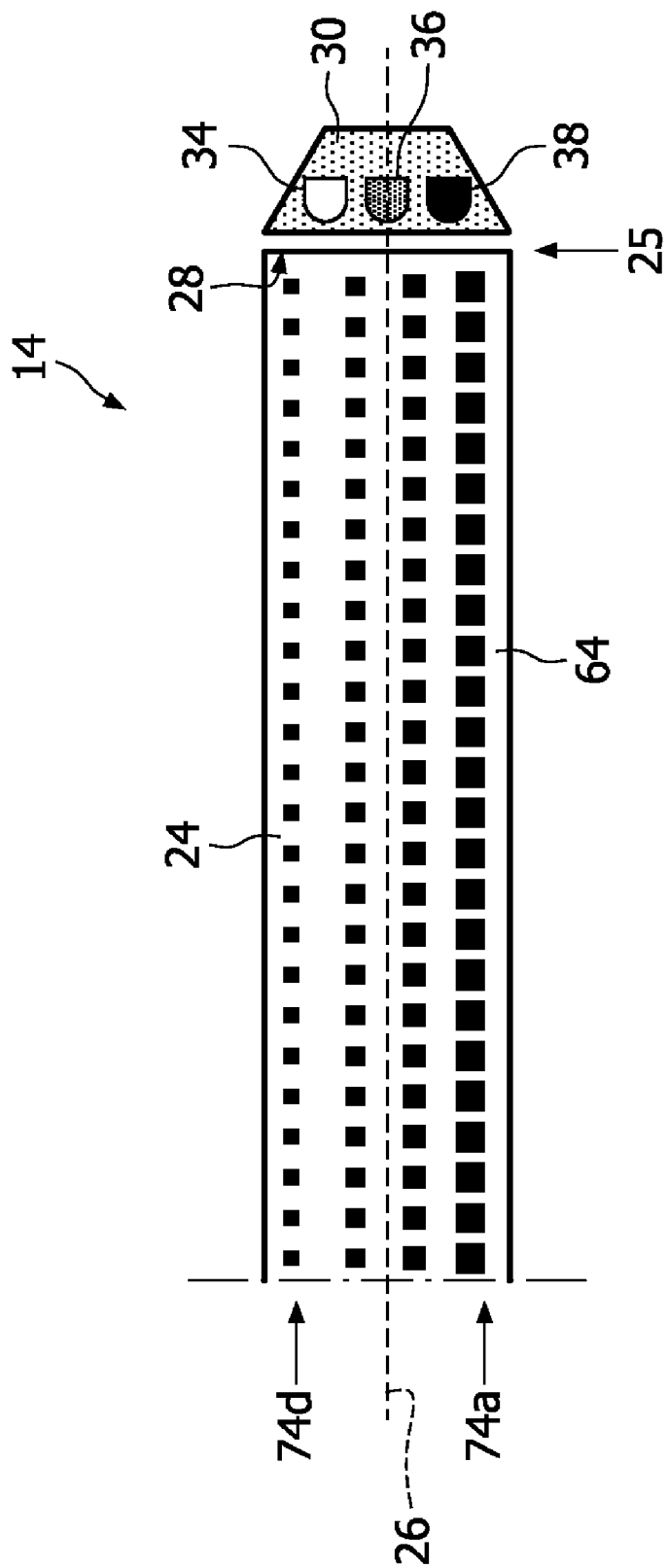

FIGS. 2A, 2B and 2C show several embodiments of the light projection system 10, 12, 14 according to the invention seen from the projection surface 50. As indicated above, the distribution and/or size of the light out-coupling elements 60, 62, 64 and as such the luminous intensity emitted by the sub-sets 70a, 70b, 70c, 70d, 72a, 72d, 74a, 74d may vary along the tangential direction 27 (see FIG. 1) around the longitudinal axis 26 of the light guide 20 to enable a more even illumination of the projection surface 50. FIGS. 2A, 2B and 2C show different embodiments to obtain this variation along the tangential direction 27.

In addition, the distribution of the light out-coupling elements 60, 62, 64 may vary along the longitudinal axis 26, for example, to keep the light coupled out along the longitudinal axis 26 substantially constant, as is disclosed in the known longitudinal light guides. However, when using a cylindrical longitudinal light guide 20 constituted of solid material, the longitudinal light guide 20 substantially acts as a cylindrical lens spreading the light emitted by each of the light out-coupling elements 60, 62, 64 in a direction substantially parallel to the longitudinal axis 26 while collimating the light emitting by each of the light out-coupling elements 60, 62, 64 in a direction substantially perpendicular to the longitudinal axis 26. The spreading of the light in a direction substantially parallel to the longitudinal axis 26 reduces the need for a variation of the light out-coupling elements 60, 62, 64 along the longitudinal axis 26.

FIG. 2A shows a light projection system 12 comprising a light guide 22 and a light source 30. The light source 30 comprises a plurality of light emitting diodes 34, 36, 38, each emitting light of a different primary color R, G, B. The light guide 22 comprises an arrangement of the light out-coupling elements 62 arranged in lines 62 of which a length of the light out-coupling elements 62 changes along the tangential direction 27 around the longitudinal axis 26. Light of the light source 30 is emitted via the light input window 28 into the light guide 22 and is distributed throughout the light guide 22, preferably via TIR. When the light impinges on a light out-coupling element 62, the light will be projected to the projection surface 50. The light guide 22 is divided into several sub-sets 72a, 72d in which the first sub-set 72a illuminates the first area 50a (see FIG. 1) and in which the second sub-set 72d illuminates the second area 50d (see FIG. 1). Of course, the skilled person may change the division of the light guide 22 into sub-sets 72a, 72d, for example, increase the number of sub-sets 72a, 72d. Furthermore, the variation of the length of the light out-coupling elements 62 may change more gradual such that the light out-coupling elements 62, for example, may be arranged in triangles comprising the light out-coupling elements 62 (see FIG. 3). In such an arrangement, each sub-set of light out-coupling elements, for example, comprises a single light out-coupling element 62.

FIG. 2B shows a light projection system 10 comprising a light guide 20 and a light source 30 and a further light source 32. The light source 30 and the further light source 32 each comprise a plurality of light emitting diodes 34, 36, 38, each emitting light of a different primary color R, G, B. The light guide 20 comprises an arrangement of the light out-coupling elements 60 arranged as dots 60 of substantially equal size in which a density of the light out-coupling elements 60 changes along the tangential direction 27 around the longitudinal axis 26. Light of the both light sources 30, 32 is emitted via the light input window 28 into the light guide 20 and is distributed throughout the light guide 20, again preferably via TIR. When the light impinges on a light out-coupling element 60, the light will be projected to the projection surface 50. The light guide 20 is divided into several sub-sets 70a, 70b, 70c, 70d in which the first sub-set 70a illuminates the first area 50a (see FIG. 1) and in which the second sub-set 70d illuminates the second area 50d (see FIG. 1). Of course, the skilled person may change the division of the light guide 20 into sub-sets 70a, 70b, 70c, 70d, for example, increase the number of sub-sets 70a, 70b, 70c, 70d. Furthermore, the variation of the density of the light out-coupling elements 60 may change more gradual such that the light out-coupling elements 60, for example, each sub-set of light out-coupling elements, for example, comprises a single line of light out-coupling element 60.

In the embodiment shown in FIG. 2B the light projection system 10 comprises a light source 30 and a further light source 32. The light source 30 is arranged at a first end 21 of the light guide 20 and the further light source 32 is arranged at a second end 19 of the light guide 20. In a preferred embodiment, the color and/or intensity of the light emitted by the light source 30 is different from the light emitted by the further light source 32. The light projected by the light projection system 10 on the projection surface 50 may vary in color and/or intensity along the longitudinal axis 26 of the light guide 20. The light emitted by the light source 30 may, for example, be modulated by video and/or audio content representing a first image-area 42a (see FIG. 3) of the image displayed on the image display area 42, and the light emitted by the further light source 32 may, for example, be modulated by video and/or audio content represented by a second image-area 42b of the image displayed on the image display area 42. Using the further light source 32, the projected light may more closely relate to the image displayed on the image display area 42 and as such enhance the visual experience of a user when watching the display device 40.

FIG. 2C shows a light projection system 14 comprising a light guide 24 and a light source 30. The light source 30 comprises a plurality of light emitting diodes 34, 36, 38, each emitting light of a different primary color R, G, B. The light guide 24 comprises an arrangement of the light out-coupling elements 64 arranged as dots 64 in which a size of the light out-coupling elements 64 changes along the tangential direction 27 around the longitudinal axis 26. Light of the light source 30 is emitted via the light input window 28 into the light guide 24 and is distributed throughout the light guide 24. When the light impinges on a light out-coupling element 64, the light will be projected to the projection surface 50. The light guide 24 is divided into several sub-sets 74a, 74d in which the first sub-set 74a illuminates the first area 50a (see FIG. 1) and in which the second sub-set 74d illuminates the second area 50d (see FIG. 1). Of course, the skilled person may change the division of the light guide 24 into sub-sets 74a, 74d, for example, increase the number of sub-sets 74a, 74d. Furthermore, the variation of the size of the light out-coupling elements 64 may change more gradual such that the light out-coupling elements 64, for example, each sub-set of light out-coupling elements, for example, comprises a single line of light out-coupling element 64.

Figure 3:
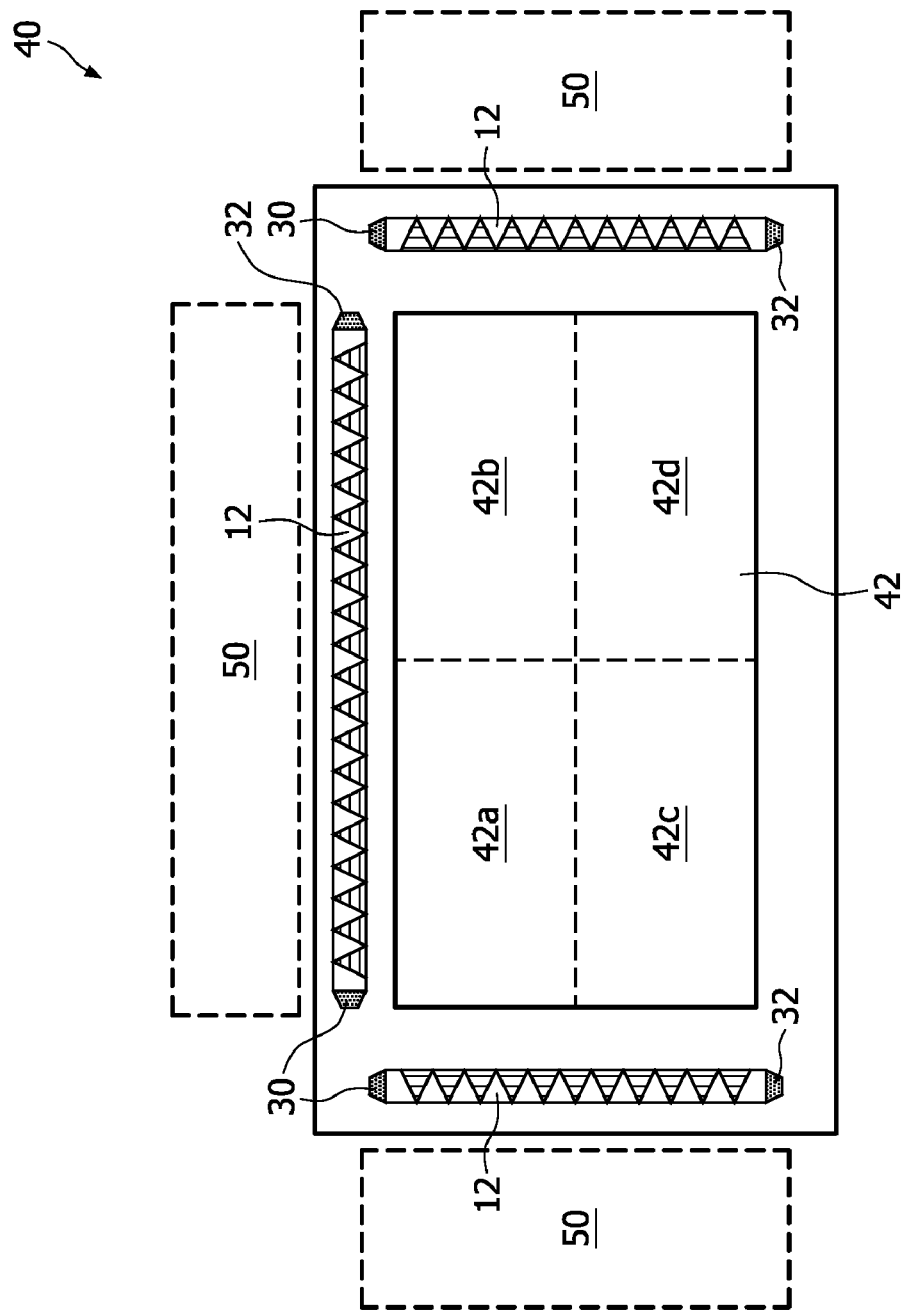
FIG. 3 shows a front view of the display device comprising a plurality of light projection systems.

FIG. 3 shows a front view of the display device 40 comprising a plurality of light projection systems 12 according to the invention. In this front view, the light projection systems 12 are drawn visible, while these light projection systems 12 in the embodiment shown are arranged out of sight of a viewer behind the display device 40. The light projection systems 12 are arranged around the periphery of the image display area 42. Each of the plurality of light projection systems 12 project light modulated by video and/or audio content of the display device on the projection surface 50. Each light projection system 12 comprises a light source 30 and a further light source 32. The light emitted by the light source 30 may differ from the light emitted by the further light source 32 such that a color and/or intensity variation along the longitudinal axis 26 (see FIG. 2) substantially corresponds to the color and/or intensity variation over the image displayed on the image display area 42. For this reason, the image display area 42 may be divided into the first image-area 42a, the second image-area 42b, a third image-area 42c and a fourth image area 42d. Preferably the light emitted by the light source 30 or the further light source 32 is modulated by audio content and by video content of the image-area 42a, 42b, 42c, 42d which is arranged close to a part of the light guide 22 via which the light is projected towards the projection surface 50.

Figure 4:
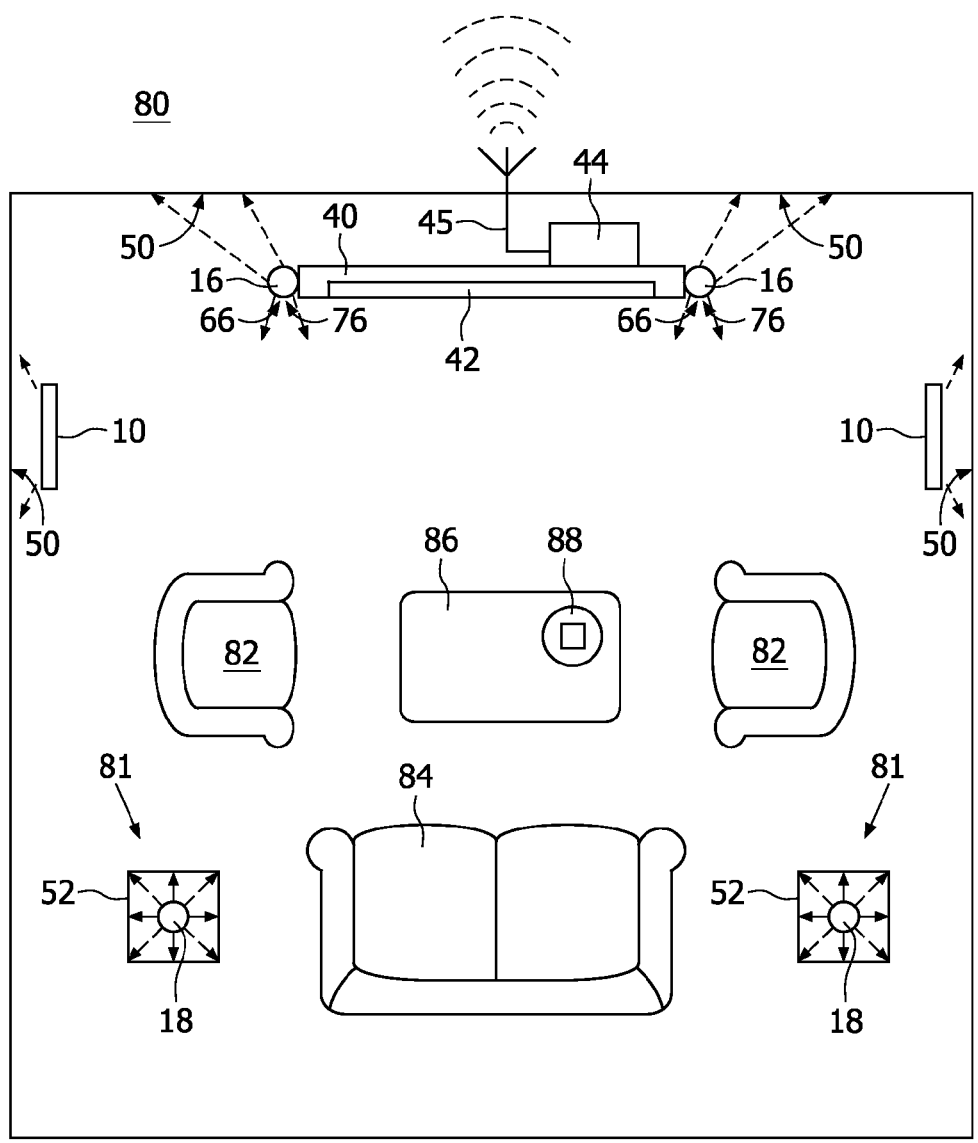
FIG. 4 shows a top view of a room in which several embodiments of the light projection system according to the invention are applied.

FIG. 4 shows a top view of a room 80 in which several embodiments of the light projection system 10, 16, 18 according to the invention are applied. The room 80 comprises a display device 40 comprising the image display area 42, the control unit 44 and a pair of light projection systems 16 arranged on either side of the image display area 42. The control unit 44 extracts color and/or intensity information from video and/or audio content, for example, from different image areas 42a, 42b, 42c, 42d (see FIG. 3). The extracted color and/or intensity information is subsequently used for modulating the light emitted by the light sources 30, 32 (see FIG. 3) of the light projection systems 10, 16, 18. In the embodiment shown in FIG. 4 the control unit comprises an antenna 45 and transmits information related to the extracted color and/or intensity to remotely located light projection systems 10, 18. The modulated light is subsequently projected on the projection surface 50, 52. The room 80 may further comprise furniture such as a sofa 84, two chairs 82 and a table 86. The table 86, for example, may comprise an ornamental object 88, such as a 5-year anniversary present of DeltaPatents.

A first embodiment of the light projection system 16 according to the invention is attached to the display device 40 and is arranged on either side of the image display area 42. Next to any of the light out-coupling elements 60, 62, 64 as shown in FIG. 2, the light projection system 16 further comprises additional light out-coupling elements 66 arranged to emit light away from the projection surface 50 directly toward a viewer (not shown) located in the room 80.

A second embodiment of the light projection system 10 according to the invention is arranged as a separate physical object, for example, a lamp, for example, a so called wall-washer, or, for example, an interior decoration element. The light projection system 10 may also project part of the light on to the ceiling of the room 80. The light projection system 10 comprises a light source which emits light which is modulated by video and/or audio content of the display device 40. For example, the light projection system 10 may receive the wireless signal emitted by the control unit 44 via the antenna 45 and from this received signal determine what color and/or intensity the light projected to the projection surface 50 is required. Alternatively, the control unit 44 may provide information to the light projection system 10 via a wired connection, for example, via an in-home network, or, for example, via a power-line communication system. Alternatively, the light projection system 10 may comprise a sensor via which the light projection system 10 determines the required color and/or intensity of the light projected on the projection surface 50.

A third embodiment of the light projection system 18 according to the invention is again arranged as a separate physical object, for example, as a shaded lamp 81 in which the light projection system 18 projects the modulated light on the lamp-shade 52. Alternatively, the light projection system 18 may also project part of the light on to the ceiling of the room 80. In the embodiment shown in FIG. 4 in which the lamp-shade 52 has a substantially square cross-section, the luminous intensity emitted by the sub-sets arranged in the light projection system 18 change in tangential direction in which the variation is repeated substantially every 90 degree rotation along the tangential direction. Other shapes of the lamp-shade 52 may require a different variation of the luminous intensity to obtain a substantially uniform illumination. The light projection system 18 may receive the wireless signal emitted by the control unit 44 or may receive information via a wired connection, for example, via the in-home network, or, for example, via the power-line communication system.

The arrangement of the second and third embodiment of the light projection system 10, 18 according to the invention enable the light filling the room 80 to be modulated by video and/or audio content of the display device 40.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Light projection system (10, 12, 14, 16, 18) for use in conjunction with a display device (40), the light projection system (10, 12, 14, 16, 18) comprising:
   a light source (30) for emitting light being modulated by video and/or audio content of the display device (40), and
   a longitudinal light guide (20, 22, 24) for guiding light emitted by the light source (30) substantially along a longitudinal axis (26) and for projecting the light propagating through the longitudinal light guide (20, 22, 24) on a projection surface (50, 52), the longitudinal light guide (20, 22, 24) comprising:
      a light input window (28) arranged at an end-portion of the longitudinal light guide (20, 22, 24), the light input window (28) being arranged for coupling in light from the light source (30) into the longitudinal light guide (20, 22, 24) substantially along the longitudinal axis (26), and
      a plurality of light out-coupling elements (60, 62, 64) contained within the longitudinal light guide for projecting the light on the projection surface (50, 52), at least one of the plurality of light out-coupling elements (60, 62, 64) comprising sub-sets (70a, 70d; 72a, 72d; 74a, 74d) of light out-coupling elements (60, 62, 64), a particular sub-set (70a, 70d; 72a, 72d; 74a, 74d) being arranged for substantially illuminating a particular area (50a, 50d) of the projection surface (50, 52), a luminous intensity emitted by the particular sub-set (70a, 70d; 72a, 72d; 74a, 74d) being dependent on a distance ($d_a$, $d_d$) along a straight line between the particular sub-set (70a, 70d; 72a, 72d; 74a, 74d) and the particular area (50a, 50d), and/or on an angle between the straight line and normal of the projection surface (50, 52).

2. Light projection system (10, 12, 14, 16, 18) as claimed in claim 1, wherein the luminous intensity emitted by the particular sub-set (70a, 70d; 72a, 72d; 74a, 74d) increases when the distance ($d_a$, $d_d$) along the straight line between the particular sub-set (70a, 70d; 72a, 72d; 74a, 74d) and the particular area (50a, 50d) increases, and/or when the angle between the straight line and the normal of the projection surface (50, 52) increases.

3. Light projection system (10, 12, 14, 16, 18) as claimed in claim 1, wherein the luminous intensity emitted by the particular sub-set (70a, 70d; 72a, 72d; 74a, 74d) is dependent on a density of light out-coupling elements (60) in the particular sub-set (70a, 70d), or is dependent on a dimension of the light out-coupling elements (62, 64) in the particular sub-set (72a, 72d; 74a, 74d).

4. Light projection system (10, 12, 14, 16, 18) as claimed in claim 1, wherein the luminous intensity emitted by the sub-sets (70a, 70d; 72a, 72d; 74a, 74d) changes in a tangential direction (27) around the longitudinal axis (26).

5. Light projection system (10, 12, 14, 16, 18) as claimed in claim 1, wherein the plurality of light out-coupling elements (60, 62, 64) are arranged at a wall of the longitudinal light guide (20, 22, 24), the wall being arranged substantially parallel to the longitudinal axis (26).

6. Light projection system (10, 12, 14, 16, 18) as claimed in claim 5, wherein the plurality of light out-coupling elements (60, 62, 64) arranged at the wall of the longitudinal light guide (20, 22, 24) are arranged at a side of the longitudinal axis (26) facing away from the projection surface (50, 52).

7. Light projection system (10, 12, 14, 16, 18) as claimed in claim 6, wherein the longitudinal light guide (20, 22, 24) is constituted of a solid material being substantially transparent to the light emitted by the light source (30).

8. Light projection system (10, 12, 14, 16, 18) as claimed in claim 6, wherein a further sub-set (76) of further light out-coupling elements (66) are arranged for emitting light away from the projection surface (50).

9. Light projection system (10, 12, 14, 16, 18) as claimed in claim 1, wherein the out-coupling elements (60, 62, 64) are chosen from the group comprising scratches, sandblasted structures, printed structures, indents, slits, lacquer and stickers.

10. Light projection system (10, 12, 14, 16, 18) as claimed in claim 1, wherein the light source (30) comprises plurality of light emitting elements (34, 36, 38), each light emitting element (34, 36, 38) emitting light of a primary color (R, G, B).

11. Light projection system (10, 12, 14, 16, 18) as claimed in claim 1, wherein the longitudinal light guide (20, 22, 24) comprises a further end-portion (19) comprising a further light source (32).

12. Display device (40) comprising an image display area (42) and comprising the light projection system (10, 12, 14, 16, 18) as claimed in claim 1.

13. Display device (40) as claimed in claim 12, wherein the display device (40) further comprises a control unit (44) for extracting color and/or intensity information from video and/or audio content, and for modulating the light emitted by the light source (30) according to the extracted color and/or intensity information.

14. Display device (40) as claimed in claim 12, wherein the light projection system (10, 12, 14, 16, 18) and the image display area (42) are arranged in separate physical objects arranged at different locations.

15. Display device (40) as claimed in claim 12, wherein the light projection system (10, 12, 14, 16, 18) is rotatable around the longitudinal axis (26).

16. Display device (40) as claimed in claim 12, wherein the display device (40) comprises a plurality of light projection systems (10, 12, 14, 16, 18) arranged around the periphery of the image display area (42).

* * * * *